United States Patent Office 3,122,432
Patented Feb. 25, 1964

3,122,432
COMPOSITION AND METHOD FOR PRESERVING CUT FLOWERS
Percival Ross Biggs, The Alcove, 9 Toll Road, Rondebosch, Cape Province, Republic of South Africa
No Drawing. Filed Feb. 13, 1961, Ser. No. 88,640
Claims priority, application Republic of South Africa Feb. 12, 1960
5 Claims. (Cl. 71—2.4)

This invention relates to a preservative medium suitable for vegetable matter such as cut flowers, picked fruit, and the like.

It is an object of this invention to provide means for prolonging the life of cut flowers, over that which they have when placed merely in water. It is a further object of this invention, to provide means to maintain the freshness and edibility of citrus fruits long after they have been picked, and to improve their salability.

According to the invention, a vegetable matter preservative medium includes as ingredients a predominant amount of a water soluble non-ionic organic nutrient medium permeable to protoplasm when in solution, a water soluble compound of sulphur selected from a group comprising substances adapted to produce sulphate ions in solution and substances adapted to produce sulphite ions in solution, a water soluble substance adapted to produce phosphate ions in solution, a water soluble substance adapted to produce potassium ions in solution, a water soluble substance adapted to provide boron, and a fermentation and mould inhibitor but excluding compounds of the heavy metals and synthetic halogenated compounds; and which is adapted when in aqueous solution to have a pH value falling within the range 2.5 to 5.5.

The non-ionic organic nutrient medium may be selected from the group comprising sucrose, glucose, invert sugar, glycerol, mannitol, and sorbitol and the water soluble compound of sulphur may be selected from the group comprising potassium sulphate, potassium bisulphate, sulphuric acid, potassium sulphite, and potassium bisulphite. Again, the substance adapted to produce phosphate ions in solution may be selected from the group comprising potassium dihydrogen phosphate, dipotassium hydrogen phosphate, and phosphoric acid, and the substance adapted to produce potassium ions in solution may be selected from the group comprising potassium sulphate, potassium bisulphate, potassium sulphite, potassium bisulphite, potassium dihydrogen phosphate, and dipotassium hydrogen phosphate. Further, the water soluble substance adapted to provide boron may be selected from the group comprising boric acid, borax, and potassium borate, and the fermentation and mould inhibitor may be selected from the group comprising alkali benzoates and sulphites such as sodium benzoate, potassium benzoate, sodium sulphite, potassium sulphite, and potassium bisulphite. The pH of the aqueous solution may be rendered to a desired value within the range by treatment with a substance selected from the group comprising the inorganic acids, sulphuric and phosphoric acid, the organic acids citric, tartaric, malic, and succinic acid, and the acidic salts potassium bisulphate, potassium bisulphite, potassium dihydrogen phosphate, and potassium bitartrate.

It will be noted that some of the compounds listed can serve double or even triple functions. For example potassium sulphate is adapted to supply both potassium and sulphate ions, and potassium dihydrogen phosphate is adapted to supply not only potassium and phosphate ions, but also acidity.

The quantities of ingredients used may be varied somewhat, so for example there may be provided:

Twelve to fifteen pounds of sucrose as nutrient;
50 to 80 grams of potassium sulphate to provide potassium and sulphate ions;
Traces of boric acid to provide boron;
40 to 72 grams of sodium benzoate as fermentation and mould inhibitor; and
26 to 90 grams of orthophosphoric acid for pH control.

This medium is in the form of a syrup.

A specific example of a medium also in syrup form and prepared according to the following Example I is suitable for the treatment of citrus fruits, and when suitably diluted also for preserving cut flowers such as carnations.

EXAMPLE I

Dissolve 13½ lbs. of sucrose in 12 pints of water, boil the solution and then allow it to cool to room temperature, and then add 61½ grams of potassium sulphate, ½ gram of boric acid, 56 grams of sodium benzoate, and 40 grams of orthophosphoric acid (23 ccs. 89%).

The medium may also be prepared in powder form and for this purpose, the phosphoric acid liquid may be replaced by two dry powders, namely potassium dihydrogen phosphate to provide phosphate ions and part of the acidity, and citric acid to give the required pH value. The medium may have the following ingredients in the following ranges of proportions:

184 to 228 grams sucrose as nutrient;
1.64 to 2.62 grams of potassium sulphate for providing potassium and sulphate ions;
2 to 7 grams of potassium dihydrogen phosphate for providing phosphate and potassium ions;
Traces of boric acid to provide boron;
.93 to 2.34 grams of sodium benzoate as fermentation and mould inhibitor;
½ gram to 10 grams of citric acid for pH control.

A specific example of the medium, this time in water soluble powder form, is given in the following Example II.

EXAMPLE II 206 grams of sucrose;
2 grams of potassium sulphate;
3 grams of potassium dihydrogen phosphate;
Traces of boric acid;
1¼ grams of sodium benzoate; and
1½ grams of citric acid.

In use, an aqueous solution of the preservative medium as given in Example I, in the ratio 1 part to 13 parts by volume of water, and having a pH value within the range 4 to 5 is provided, and carnations are then placed in the solution so provided.

Again, 25 grams of the powder mixture of Example II are dissolved in one pint of water, and carnations are then placed in the solution so provided.

Tests of the action of the preservative medium on cut carnations show that the particular combination of the ingredients in the preservative medium, prolong the life of the carnations, beyond that obtainable when the ingredients are used separately. Table I below shows a summary of the results obtained, when the actions of the several ingredients separately in solution, were tested on carnations.

Table I

| Ingredients used shown below | Average number of days lasted per bloom | Difference as compared with water only, days |
|---|---|---|
| Water only | 8 | |
| Water plus Sucrose | 15 | +7 |
| Water plus Potassium Sulphate | 11 | +3 |
| Water plus Boric Acid | 9 | +1 |
| Water plus Sodium Benzoate | 8 | +0 |
| Water plus Ortho Phosphoric Acid | 9 | +1 |

It will be noted that the total increase in life to be expected from the several ingredients, when used together, upon the basis of the increase in life given by them separately, is twelve days. It was, however, found that when the ingredients were prepared in accordance with the invention, the increase in life was significantly greater than twelve days, as will appear from the following Table II.

A summary of results obtained in testing more than one thousand blooms in preservative medium solutions according to the invention having pH values varying from 2.5 to 5.5 is given in Table II.

Table II

| Preservative Medium pH Value | Average number of days lasted per bloom at room temperature 65–75° F. | Average number of days lasted per bloom in cold store 40–45° F. |
|---|---|---|
| 2.5 | 20.1 | 42 |
| 3.0 | 21.6 | 44.6 |
| 3.5 | 23.1 | 46.5 |
| 4.0 | 23.5 | 48.2 |
| 4.5 | 25.8 | 52.0 |
| 5.0 | 24.0 | 47.1 |
| 5.5 | 21.2 | 43.0 |
| Water Control | 8.0 | 28.0 |

It will be apparent from Table II, that for carnations the optimum pH value is 4.5. A preservative medium having this pH value, gives an increase of life of blooms at room temperature, of 5.8 days more than the twelve days expected on the basis of the increased life provided by the ingredients separately. The combination of the various ingredients, therefore, has a synergistic effect resulting in an increase of life at the optimum pH value, of 5.8 days. The table further shows that the increase in life is less, when the pH value differs from this optimum value.

In experiments with the preservation of fruit, a preservative medium in accordance with the invention was prepared by dissolving 13½ lbs. sucrose in 12 pints of water. This solution was then boiled for 1 minute and allowed to cool to room temperature. Thereupon there was dissolved in this solution:

61.50 grams potassium sulphate;
0.55 gram boric acid;
56.00 grams sodium benzoate;
40.00 grams ortho phosphoric acid (23 ccs. 89%).

Oranges were then dipped in the solution, and wrapped in 200 gauge polythene film. The oranges had been originally grown at a place 1300 miles from the place where they were treated and wrapped, and after having been kept for three months, they were returned to the place where they were grown, for examination as to their condition. The result of such examination, together with controls of untreated oranges, and oranges untreated but wrapped in polythene film, are given in Table III.

Table III

| | Box No. 1 | Box No. 2 | Box No. 3 |
|---|---|---|---|
| | Untreated Exposed to air | Untreated Wrapped in Polythene film only | Treated with medium and wrapped in Polythene film |
| External appearance of skin. | Poor, wilted, leathery. | Moist, Good. | Moist and Excellent. |
| External appearance of Button. | Brown and dead. | Starting to go brown. | Green and alive. |
| Flavour | Very poor | Good | Exceptionally good. |
| Juice | Dry | do | Excellent. |
| Remarks | Useless for sale. | Salable | As good as freshly picked orange. |

It will be noted from the table that while wrapping in polythene film is advantageous, significantly better results are obtained, when the oranges are first treated with preservative medium, and then wrapped in polythene film.

The invention extends also to the method of using the preservative medium for the preservation of vegetable substances and to the substances so preserved.

I claim:

1. A preservative medium for the preservation of cut flowers consisting essentially of about twelve to fifteen pounds of sucrose as a water-soluble non-ionic nutrient medium, about 50 to 80 grams of potassium sulphate as a source of potassium and sulphate ions, traces of boric acid as a source of boron, about 40 to 72 grams of sodium benzoate as fermentation and mold inhibitor, and about 26 to 90 grams of orthophosphoric acid for pH control within the range 2.5 to 5.5.

2. A water-soluble preservative medium for cut flowers consisting essentially of about 184 to 228 grams sucrose as nutrient medium, about 1.64 to 2.62 grams of potassium sulphate as a source of potassium and sulphate ions, about 2 to 7 grams of potassium dihydrogen phosphate as a source of phosphate and potassium ions, traces of boric acid as a source of boron, about 0.93 to 2.34 grams of sodium benzoate as fermentation and mold inhibitors, and about ½ gram to 10 grams of critic acid for pH control within the range 2.5 to 5.5.

3. A preservative medium for cut flowers consisting essentially of about 206 grams of sucrose, about 2 grams of potassium sulphate, about 3 grams of potassium dihydrogen phosphate, traces of boric acid, and about 1¼ grams of citric acid for pH control within the range 2.5 to 5.5.

4. Process for preserving cut carnations comprising dissolving about 13½ lbs. of sucrose in about 12 pints of water, boiling the resultant solution, cooling the solution to ambient temperature, adding to the cooled solution about 60 grams of potassium sulphate, about ½ gram of boric acid, about 56 grams of sodium benzoate, and about 40 grams of orthophosphoric acid, dissolving about one part by volume of the resultant preservative in about thirteen parts by volume of water, adjusting the water solution so formed to a pH value of between 4 and 5, and standing said cut carnations in said solution whereby said carnations are preserved.

5. Method of preserving cut carnations comprising admixing in dry form about 206 grams of sucrose, about 2 grams of potassium sulphate, about 3 grams of potassium dihydrogen phosphate, traces of boric acid, about 1¼ grams of sodium benzoate, and about 1½ grams of citric acid, dissolving said admixture in water in the proportion of about 25 grams admixture per one pint of water, and standing said cut carnations in the resultant solution, whereby said carnations are preserved.

References Cited in the file of this patent

UNITED STATES PATENTS

| 2,971,292 | Malecki | Feb. 14, 1961 |
| 3,000,722 | Linnolt | Sept. 19, 1961 |